May 25, 1937. R. A. SCHATZEL 2,081,384

INSULATED ELECTRICAL CONDUCTOR

Filed Dec. 23, 1931

INVENTOR
Rudolph A. Schatzel.

BY
ATTORNEYS.

Patented May 25, 1937

2,081,384

UNITED STATES PATENT OFFICE 2,081,384

INSULATED ELECTRICAL CONDUCTOR

Rudolph A. Schatzel, Rome, N. Y., assignor to General Cable Corporation, New York, N. Y., a corporation of New Jersey Application December 23, 1931, Serial No. 582,702

12 Claims. (Cl. 173—264)

This invention relates to insulated electrical conductors, and electrical insulating materials having a high heat resistance. It is an object of the invention to provide improved insulated conductors. Other objects and advantages of the invention will appear hereinafter.

An illustrative embodiment of the invention selected merely for descriptive purposes, and charts disclosing comparatively the improved heat-resistant characteristics of the improved rubber compound are shown in the accompanying drawing in which.

Insulated electrical conductors such as are used for headlight and other equipment wiring on steam locomotives are subjected to severe heat and moisture conditions. The insulated conductors usually are run through conduits along the sides of the locomotives, and are exposed to heat which may at times reach 250 or 275 degrees Fahrenheit. Because of this high heat, and because of the conditions of the installation and the great variation in heat, much moisture is condensed on the insulated conductors. Consequently the insulation for such conductors should have a high resistance to heat and moisture. Furthermore, the finish on such conductors should not stick to the wall of the conduit or deteriorate after long periods at the high temperatures.

Rubber compounds heretofore used for insulating electrical conductors are not satisfactory for this type of service because of the rapid deterioration at the high temperatures to which the insulated conductors are subjected. The finishing waxes or compounds heretofore used on insulated conductors become brittle and crack, or run and stick to the wall of the conduit at high temperatures, making replacement difficult in the event of failure of the insulation.

According to this invention a rubber compound having an extremely high resistance to deterioration by heat is used for insulating the conductors. Applicant has found that a satisfactory compound is obtained by adding a small amount of tetramethyl-thiuram disulphide to the rubber mixture which contains no free sulphur prior to vulcanization, thoroughly dispersing the tetramethyl-thiuram disulphide in the mixture, and heating the mixture to effect vulcanization through the agency of the tetramethyl-thiuram disulphide and without the addition of free sulphur or other material heretofore known to have the property of functioning as a vulcanizing agent for rubber.

One suitable mixture given merely by way of example, is as follows:

| | Per cent by weight |
|---|---|
| Smoked sheets | 32 |
| Tetramethyl-thiuram disulphide | 1.5 |
| Neozone A | .5 |
| V. G. B. (anti-oxidant) | 1.0 |
| Cyco drier | 1.5 |
| Carbon black | .5 |
| Barytes | 10.0 |
| Zinc oxide | 30.0 |
| Whiting | 23.0 |

Figure 2:
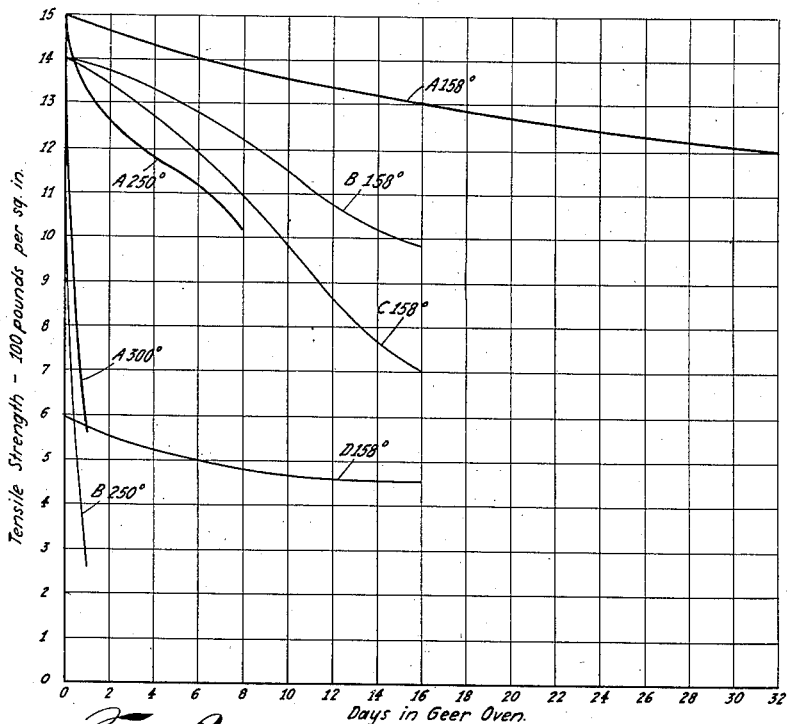
Fig. 2 is a chart showing the tensile strength of the improved rubber compound as compared with known compounds.
Figure 3:
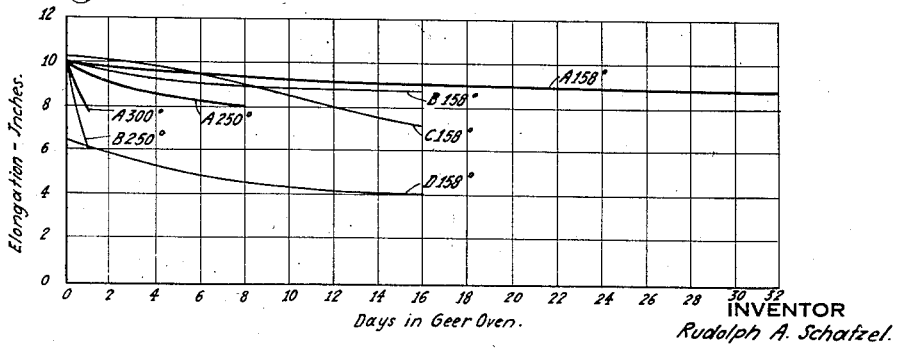
Fig. 3 is a chart showing the elongation of the improved rubber compound as compared with known compounds.

Such a vulcanized rubber compound has a very high resistance to heat as compared with vulcanized rubber compounds heretofore used for insulating electrical conductors. Referring to Figs. 2 and 3 of the drawing, the abscissas represent the number of days the rubber compounds were tested in a Geer oven, and the ordinates represent, respectively, the tensile strength in hundreds of pounds per square inch, and the elongation in inches of the rubber compounds. The curves "A" show the performance of the improved rubber compound disclosed in this application. The curves "B" show the performance of a 30% dry mineral rubber compound heretofore used for insulating electrical conductors for locomotive service. The curves "C" show the performance of the American Railway Association specification 30% dry mineral rubber compound. The curves "D" show the performance of the rubber compound specified for "Code" wire. The numerals following the reference letters for the curves give the temperatures of the Geer oven in degrees Fahrenheit during the tests.

Referring to Fig. 2, curve "A 158°", it will be seen that the tensile strength of the improved rubber compound disclosed in this application initially is 1500 pounds per square inch, and decreases gradually to 1200 pounds after 32 days in the Geer oven at 158° F. (70° C.). Curve "B 158°" shows that the tensile strength of this particular rubber compound decreases from an initial value of 1400 pounds per square inch to slightly less than 1000 pounds after only 16 days in the Geer oven at 158° F. From curve "C 158°" it is seen that the tensile strength of a rubber compound meeting the specifications of the American Railway Association drops rapidly from an initial value of 1400 pounds per square inch to 700 pounds after 16 days in the Geer oven at 158° F. The heat resistant qualities of this compound are much below those of the B compound. The curve "D 158°" shows the much lower tensile strength for "Code" wire rubber at 158° F. The curves "A 250°", "B 250°" and "A 300°" show the tensile strength characteristics of the A and B compounds at the temperatures specified, and it will be noted that the A compound performs much better at 300° F. than does the B compound at 250° F.

Referring to Fig. 3, it will be seen that the initial elongation of the A compound is approximately 10 inches, and that this decreases very gradually to approximately 9 inches after 32 days in the Geer oven at 158° F. The B compound has an initial elongation of 10 inches, but this drops to less than 9 inches after 16 days in the Geer oven at 158° F. The C compound, (American Railway Association specification) has a slightly higher initial elongation of about 10½ inches, but this decreases rather rapidly to approximately 7 inches after only 16 days in the Geer oven at 158° F. The curve "D 158°" shows the elongation of "Code" rubber compound over a period of 16 days in the Geer oven at 158° F. The other curves show the performance of the A and B compounds at higher temperatures, and it will be noted that the A compound performs much better at 300° F. than does the B compound at 250° F.

Applicant does not know just exactly what chemical reaction takes place during the vulcanization of a rubber compound which contains no free sulphur in the presence of tetramethyl-thiuram disulphide, but it is believed that the vulcanizing heat causes enough free sulphur to split off from the sulphur compound to effect vulcanization of the rubber without any overcure. The tetramethyl-thiuram disulphide is used as the vulcanizing agent, and not merely as a accelerator, and free sulphur in the compound is dispensed with. The vulcanization proceeds slowly, and there is no overcure as is the case in the vulcanization of rubber compound containing free sulphur, where vulcanization proceeds rapidly until the sulphur is completely combined. When a rubber compound which has been vulcanized with free sulphur is subjected to high heat in service, the rubber hardens, and devulcanization or reversion is believed to take place. In applicant's improved vulcanized rubber it is believed that the further application of high heat in service causes a very slow continuous decomposition of the sulphur compound vulcanizing agent, which supplies minute traces of sulphur and results in a slow further vulcanization.

Applicant has found that litharge, sometimes used in compounding rubber, is detrimental to the vulcanization of rubber by means of tetramethyl-thiuram disulphide, and desirably is not added to the rubber compound.

Applicant has found that tetramethyl-thiuram tetrasulphide may be used in place of tetramethyl-thiuram disulphide as the vulcanizing agent to produce a rubber compound having high resistance to heat.

Electrical conductors insulated with rubber usually are made of copper, and desirably have a tinned surface to facilitate the making of soldered low resistance connections. If the rubber covering on the conductor contains free sulphur prior to vulcanization, as has usually been the case, the free sulphur discolors the tinned surface of the conductor and causes the rubber compound to adhere to the surface of the conductor, thereby making it difficult to strip the vulcanized rubber insulation from the end of the conductor, and making it necessary to clean and tin the conductor before a soldered connection can be made.

Figure 1:
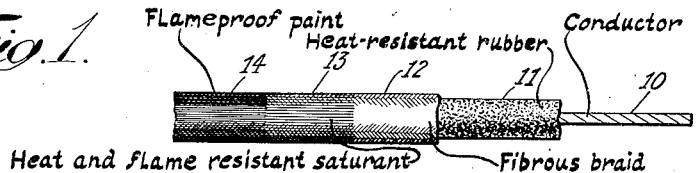
Fig. 1 shows an insulated conductor.

Referring to Fig. 1, the electrical conductor 10, which is shown merely by way of example as a stranded wire, ordinarily is copper, and has its surface tinned. The conductor is enclosed in a wall 11 of rubber compound which conveniently may be extruded on the conductor and then vulcanized. Over the rubber is a fibrous jacket 12, desirably closely braided cotton. The jacket 12 is saturated with a heat and flame-resistant compound, (indicated at 13) such as a stearin pitch compound. Over the stearin pitch is applied a finish coat 14 of flameproof paint.

By way of example the flameproof paint may have the following composition:

| | Percent by weight |
|---|---|
| Gilsonite (selects) | 12.10 |
| Toluol | 9.10 |
| No. 3 oil base | 6.05 |
| Combination wax (att. 7) | 1.50 |
| Asbestine | 3.00 |
| Talcose | 6.65 |
| White lead | 40.60 |
| Nigrosene | 1.20 |
| Lamp black | 2.40 |
| Gasoline | 17.40 | where the No. 3 oil base has the following composition:

| | |
|---|---|
| Boiled linseed oil "A" | 64.16 |
| Zinc resinate (pptd.) | 7.13 |
| Ningpolene | 26.75 |
| Stearic acid (cake) | 1.96 |

Applicant has provided vulcanized rubber compounds having characteristics which make possible the use of rubber insulated electrical conductors for protracted periods at temperatures higher than has heretofore been possible. The use of these rubber compounds permits a higher current rating for rubber insulated cables. Regular rubber covered cables are rated on the basis of a maximum conductor temperature of 60 degrees centigrade, (140° F.) but with the improved rubber compound a conductor temperature of 85 degrees centigrade, (185° F.) is permissible. This substitution of rubber compounds, without other change, permits an increase in the current carrying capacity of the cable by about 35%. Also, a rubber compound is provided which does not adhere to the surface of the conductor, and which has very satisfactory stripping characteristics, leaving a bright tin finish on the conductor which facilitates soldering. An insulated conductor suitable for the severe service of locomotive wiring is provided, the conductor being substantially flameproof, and capable of long service at high temperatures without cracking or melting of the finish coat, and without objectionable absorption of moisture.

The foregoing description of certain specific embodiments of the invention is illustrative merely, and is not intended as defining the limits of the invention.

I claim:

1. An insulated electrical conductor comprising in combination a tinned copper conductor, a vulcanized rubber covering containing tetramethyl-thiuram disulphide and no free sulphur immediately surrounding said tinned conductor, an overlying close cotton braid saturated with a stearin pitch compound, and a finish coating of flameproof paint over the saturated braid.

2. An insulated electrical conductor comprising in combination a conductor and a vulcanized rubber covering substantially free from uncombined sulphur, which upon being maintained at 158° Fahrenheit for sixteen days in a Geer oven exhibits a decrease in tensile strength not exceeding approximately 15 per cent, said rubber covering being produced by vulcanizing in the presence of a tetra alkyl substitution product of thiuram polysulphide a rubber compound containing no free sulphur.

3. An insulated electrical conductor comprising in combination a conductor and a rubber covering produced by vulcanizing in the presence of a tetra alkyl substitution product of thiuram polysulphide a rubber compound containing no free sulphur, the rubber of said covering having resistance to deterioration by heat substantially equal to that of a compound resulting from vulcanization of the following mixture:

| | Parts by weight |
|---|---|
| Rubber (smoked sheets) | 32.0 |
| Tetramethyl-thiuram disulphide | 1.5 |
| Neozone A | .5 |
| V. G. B. (anti-oxidant) | 1.0 |
| Cyco drier | 1.5 |
| Carbon black | .5 |
| Barytes | 10.0 |
| Zinc oxide | 30.0 |
| Whiting | 23.0 |

4. An insulated electrical conductor comprising in combination a conductor, a vulcanized rubber covering having a very high heat resistance to deterioration by heat of the order of 185 degrees Fahrenheit containing tetramethyl-thiuram tetrasulphide, and at no time free sulphur, surrounding said conductor, and an overlying braid saturated with a flame and heat-resistant compound.

5. An electrical conductor having a high heat-resisting rubber insulation free from uncombined sulphur and suitable for normal operation at a conductor temperature of at least 185 degrees Fahrenheit characterized by the fact that the rubber compound contains before vulcanization tetramethyl-thiuram disulphide as the only vulcanizing agent.

6. An insulated electrical conductor having rubber insulation free from uncombined sulphur and suitable for operation in locations having a temperature as high as 275 degrees Fahrenheit characterized by the fact that the rubber compound contains before vulcanization substantially 4 to 5 per cent tetramethyl-thiuram disulphide based on the rubber content as the vulcanizing agent, and that the rubber is surrounded by a fibrous jacket impregnated with a heat and flame-resistant compound.

7. An insulated electrical conductor suitable for operation in locations having a temperature as high as 185 degrees Fahrenheit, said insulated conductor comprising in combination a metallic conductor, a vulcanized heat resisting rubber covering resistant to said temperature and containing no free sulphur, an overlying braid saturated with a heat and flame-resistant compound, and a finish coating of flameproof paint over the saturated braid.

8. An insulated electrical conductor comprising in combination a conductor, a vulcanized rubber covering having a very high resistance to deterioration by heat of the order of 185 degrees Fahrenheit and containing a tetra alkyl substitution product of a thiuram polysulphide and at no time free sulphur, said rubber covering immediately surrounding the conductor without adhesion thereto, and an overlying fibrous jacket treated with a flame and heat-resistant compound.

9. An electrical conductor comprising a conducting core and a layer of heat resisting vulcanized insulation thereupon containing before vulcanization approximately one and one-half parts of tetramethyl-thiuram disulphide to 32 parts of rubber, and being free at all times from uncombined sulphur.

10. An electrical conductor suitable for use at high temperatures of the order of 185 degrees Fahrenheit comprising a conducting core and a layer of heat resisting vulcanized insulation thereupon, free from uncombined sulphur, said insulation before vulcanization being free from uncombined sulphur or litharge, and including a small proportion of a sulphur-containing vulcanizing agent.

11. An electrical conductor suitable for use at high temperatures of the order of 185 degrees Fahrenheit comprising a conducting core and a layer of heat resisting vulcanized rubber compound thereupon, which rubber compound before vulcanization was free from uncombined sulphur but included a sulphur containing vulcanizing agent not exceeding 5 per cent of the rubber content so that upon vulcanization the compound is completely vulcanized by free sulphur released from the sulphur containing vulcanizing agent, but leaving substantially no free sulphur present in the vulcanized compound.

12. An improved electrical cable suitable for use involving prolonged exposure to high heat, comprising a conducting core and an insulating covering of vulcanized rubber compound capable of withstanding prolonged exposure to a temperature of 158° Fahrenheit, said vulcanized rubber compound being substantially free from uncombined sulphur, and in the unvulcanized state containing tetramethyl-thiuram disulphide and no free sulphur.

RUDOLPH A. SCHATZEL.